(No Model.)

J. ELLIS.
VISE PIPE TONGS.

No. 441,145. Patented Nov. 25, 1890.

Witnesses
C. H. Raeder
Thomas E. Turpin

Inventor
John Ellis
By James Sheehy
Asso. Attorney

UNITED STATES PATENT OFFICE.

JOHN ELLIS, OF STOCKTON, CALIFORNIA.

VISE PIPE-TONGS.

SPECIFICATION forming part of Letters Patent No. 441,145, dated November 25, 1890.

Application filed April 15, 1890. Serial No. 348,133. (No model.)

*To all whom it may concern:*

Be it known that I, JOHN ELLIS, a citizen of the United States, residing at Stockton, in the county of San Joaquin and State of California, have invented certain new and useful Improvements in Vise Pipe-Tongs; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a class of pipe-wrenches used to connect pipes together; and it consists in the combination, with the usual handle and a curved jaw, of a pair of sliding clutches, and of such other parts and combination of parts, as will be hereinafter described, and particularly pointed out in the claim.

My invention is illustrated in the annexed drawings, in which—

Figure 1:
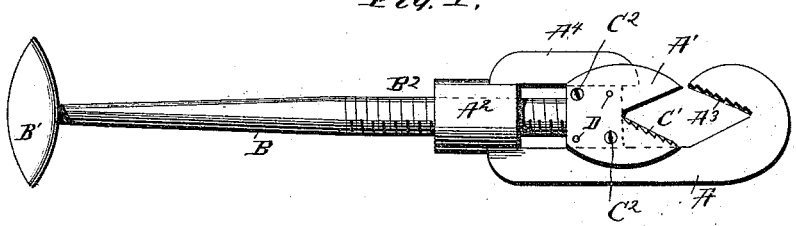
Figure 2:
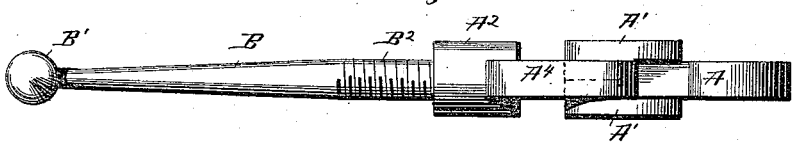
Figure 3:
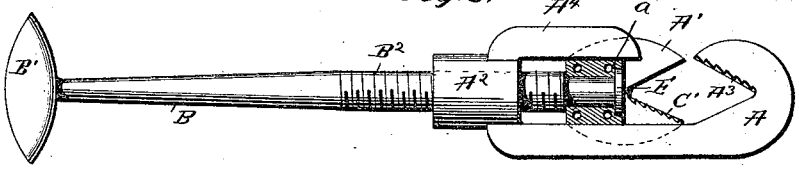

Figure 1 is a side elevation. Fig. 2 is a top view. Fig. 3 is the same as Fig. 1, with one sliding clutch removed to show the inside features.

A is a curved jaw, having an inner face $A^3$, which is serrated, and is attached at its foot to a round nut $A^2$, provided with a suitable thread, which receives the threaded stem $B^2$ of a round handle B, supplied with a head $B'$ at one end and a collar E at the summit of a neck $a$.

$A^4$ is a guide-bar attached to the nut $A^2$, parallel with and opposite to the foot of the jaw A.

$A'$ are sliding clutches, having grooved centers adapted to fit upon the stem $a$ and collar E, to which they are secured by screws $C^2$ from the right-hand side of the clutches and screws D from the left-hand side. The lower faces $C'$ of the clutches $A'$ are serrated.

By turning the head $B'$ and the handle B the sliding clutches $A'$ are moved back and forth, as desired, so as to grasp various sizes of pipes, either for purposes of attaching such together or for holding, as in a vise, for any required purpose. The serrated faces $A^3$ and $C'$ firmly grasp the pipe being operated upon.

The sliding clutches $A'$ are easily removed for purposes of repair by withdrawing the screws D and $C^2$.

I am aware that it is not new in pipe-cutters to provide a threaded shaft with a bearing movable upon a hook-jaw and to arrange in said bearing a cutter.

Having described my invention, what I claim is—

As an improved article of manufacture, a pipe-wrench consisting, essentially, of the threaded handle B, having its forward end provided with the groove $a$, and collar E, the internally-threaded nut $A^2$, the serrated jaw A, secured to the nut, the guide-bar $A^4$, also secured to the nut, the sliding clutches composed of the two parts $A'$ $A'$, grooved to receive the collar on the threaded handle, and the screws $C^2$ and D, securing the sections of the clutch on opposite sides of the hook-jaw, and the guide-bar $A^4$, substantially as specified.

In testimony whereof I affix my signature in presence of two witnesses.

JOHN ELLIS.

Witnesses:
JOSHUA B. WEBSTER,
JAMES T. SUMMERVILLE.